US006238282B1

United States Patent
Kindel et al.

(10) Patent No.: US 6,238,282 B1
(45) Date of Patent: May 29, 2001

(54) LOCOMOTIVE CABIN VENTILATION APPARATUS AND METHOD

(75) Inventors: Todd M. Kindel; Richard H. Holmes, both of Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/461,781

(22) Filed: Dec. 15, 1999

Related U.S. Application Data
(60) Provisional application No. 60/168,071, filed on Nov. 30, 1999.

(51) Int. Cl.[7] .................................................... B61D 27/00
(52) U.S. Cl. .............................................................. 454/84
(58) Field of Search ................................ 454/84, 112, 144, 454/906; 105/26.05, 456, 422, 463.1

(56) References Cited

U.S. PATENT DOCUMENTS

| | | | |
|---|---|---|---|
| 3,125,286 | * | 3/1964 | Sanders .............................. 454/906 X |
| 3,626,464 | * | 12/1971 | Van Der Sluys . |
| 3,771,293 | * | 11/1973 | Vest ..................................... 454/84 X |
| 3,996,762 | * | 12/1976 | Calme et al. . |
| 5,544,459 | * | 8/1996 | Konger . |
| 5,595,123 | * | 1/1997 | Tao et al. .......................... 105/422 X |

* cited by examiner

Primary Examiner—Harold Joyce
(74) Attorney, Agent, or Firm—Carl A. Rowold, Esq.; Holland & Knight LLP; David G. Maire, Esq.

(57) ABSTRACT

An apparatus for ventilating the cabin of a locomotive wherein the ducts serve both a ventilating and a structural function. Horizontal duct provides support for floor in place of one or more of the regularly spaced joists. Horizontal duct may include stringers recessed into sound absorbing insulation within the duct. Vertical duct is formed in part from a portion of a wall of the control compartment of the locomotive cabin, thereby eliminating the need for separate wall sections. The space saved by using such structures for dual purposes may be used to increase the cross-sectional area of the ventilating apparatus, thereby allowing the speed of fan to be reduced to provide the desired ventilation at a reduced level of sound.

28 Claims, 2 Drawing Sheets

LOCOMOTIVE CABIN VENTILATION APPARATUS AND METHOD

This application claims the benefit of the Nov. 30, 1999, filing date of U.S. provisional patent application Serial No. 60/168,071.

BACKGROUND OF THE INVENTION

The present invention relates generally to the field of heating, ventilating and air conditioning (HVAC), and more specifically to the HVAC system for the operator's cabin of a locomotive, and particularly to a method and apparatus for reducing the noise generated by the HVAC system of a locomotive.

It is known to provide an HVAC system for controlling the environmental conditions inside the operator's cabin of a railroad locomotive. A typical system, as provided by the assignee of the present invention, includes a fan and heat exchanger assembly installed below the floor of the cabin, horizontal ducts running beneath the floor between the floor joists, a vertical duct running through the control compartment forming one wall of the cabin, and a plurality of outlets connected to both the horizontal ducts and the vertical duct. Because the space for ductwork is very limited in a locomotive, the velocity of air moving through the ductwork must be maintained at a generally high level in order to satisfy the heat load specifications established for such systems. As a result, there is a considerable amount of sound energy generated by the HVAC system in a locomotive cabin. In one application, the HVAC system of a locomotive operating at maximum fan speed generates a sound level of approximately 75 dbA in the locomotive cabin.

BRIEF SUMMARY OF THE INVENTION

There is a desire on the part of some owners and operators of locomotives to reduce the background level of sound energy in the locomotive cabin. Because the HVAC system contributes significantly to the overall sound level, there is a particular need to provide a ventilation system for a locomotive that will provide the desired level of conditioning while generating a reduced sound level compared to prior art systems. There is also a particular need to produce such results with an apparatus that occupies a minimum amount of space.

Accordingly, an apparatus for ventilating a locomotive cabin is described herein having ductwork that is used for the dual function of conveying ventilating air and for some other structural purpose. By combining the function of the ductwork, one or more structural members may be eliminated, thereby providing space for increasing the size of the ducts. As the duct size is increased, the speed of the ventilating fan may be reduced without reducing the total volume of air flow, thereby reducing the level of sound generated by the apparatus.

Specifically, a low noise HVAC apparatus for a locomotive cabin is described herein as having: a fan for supplying air; a horizontal duct comprising a top portion operative to support a floor of the locomotive cabin and opposed side portions attached to the top portion and to respective opposed joists disposed under the floor, the horizontal duct in fluid communication with the fan for conveying the air; and an outlet in fluid communication with the horizontal duct for distributing the air into the locomotive cabin. By using the duct as a structural support member for the floor, one or more joists may be eliminated, thereby providing increased area under the floor for conveying ventilating air.

The apparatus is further described as including a stringer attached at opposed ends to the respective opposed joists and in contact with the horizontal duct top portion opposed the floor. The stringer provides additional support for the floor. Furthermore, the apparatus may include insulation disposed against the horizontal duct top portion opposed the floor; a cavity formed in the insulation; and the stringer at least partially disposed within the cavity. The insulation absorbs sound, thereby reducing the sound energy emitted from the apparatus. The apparatus is further described as having a vertical duct in fluid communication between the horizontal duct and the outlet, the vertical duct comprising a portion of a wall of a control compartment of the locomotive. The portion of a wall may be insulated to absorb sound and to prevent condensation from forming within the control compartment.

Similarly, a method for ventilating a locomotive cabin is described herein, the method comprising the steps of: providing a fan; replacing a joist in a floor of a locomotive cabin with a floor duct, the floor duct being operative to support the floor between adjoining opposed joists; and connecting the fan in fluid communication with the floor duct to provide air into a locomotive cabin. A further method for ventilating a locomotive cabin is described as including the steps of: providing a fan; forming a duct comprising a portion of a wall of a control compartment of a locomotive; and connecting the duct in fluid communication with the fan to provide air to the cabin of the locomotive.

BRIEF DESCRIPTION OF THE DRAWINGS

The features and advantages of the present invention will become apparent from the following detailed description of the invention when read with the accompanying drawings in which.

Similar components illustrated in more than one figure are numbered consistently in each of the figures.

DETAILED DESCRIPTION OF THE INVENTION

Figure 1:
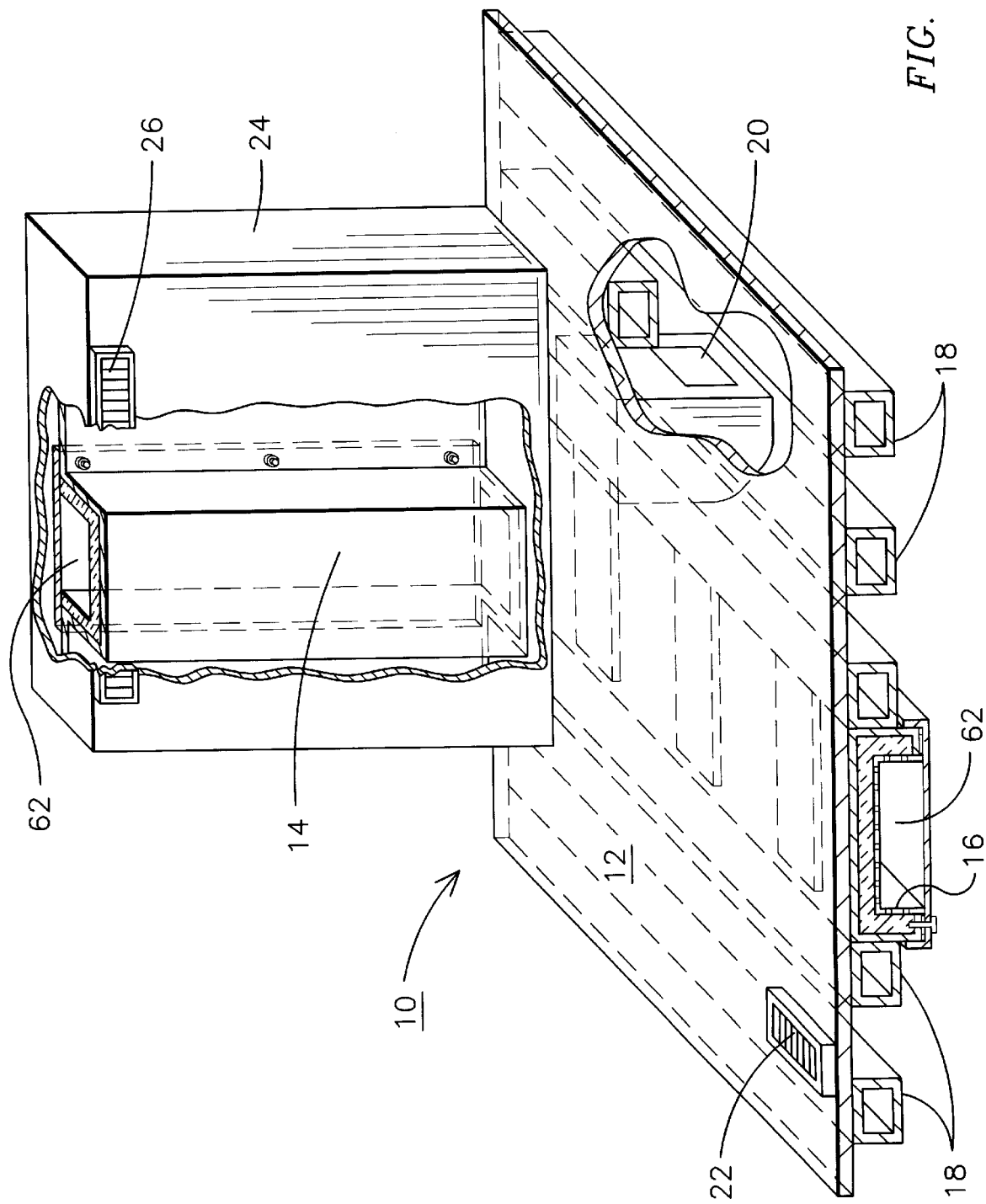
FIG. 1 is a partial perspective view of a locomotive cabin illustrating a ventilation apparatus.

FIG. 1 illustrates a portion of the cabin 10 of a locomotive with a portion of the floor 12 removed to illustrate portion of a ventilation apparatus 14. The ventilation apparatus 14 includes a horizontal duct 16 disposed between joists 18 used to support the floor 12. The ventilation apparatus 14 also includes a fan assembly 20 operable to supply air to the horizontal duct 16. Fan assembly 20 may be used to provide heated, cooled, or unconditioned air to the cabin 10 through outlet 22. One wall of the cabin 10 is formed by a control compartment 24 enclosing various controls used by an operator for controlling the operation of the locomotive. Control compartment 24 defines a sealed volume which is supplied with cooling air by a ventilation system that is separate from apparatus 14. Horizontal duct 16 is also in fluid communication with a vertical duct (not shown) formed at the rear of control compartment 24, which in turn is in fluid communication with outlet 26 for providing a second flow of ventilation to the locomotive cabin 10.

Joists 16 are regularly spaced under floor 12 to provide adequate support. In one embodiment, joists 16 are spaced XXX inches on center. However, at the location of horizontal duct 16, one such joist is missing from the regularly spaced pattern, and the support for floor 12 in that area is provided by duct 16. Prior art ventilation systems for locomotives utilized ducts that were placed between the regularly spaced floor joists, with the duct providing no structural support function. Such designs were limited in cross-sectional area by the spacing between adjacent joists. By eliminating one or more joists and using horizontal duct 16 as a support member for floor 12, the inventors have found that an increased cross-sectional floor area may be provided for ventilation air being supplied by ventilation apparatus 12. The increase in cross-sectional area allows the air moving through the duct 16 to flow at a lower velocity, thereby generating less pressure loss than in prior art designs. This improved efficiency can be used to increase the ventilation flow rate, or alternatively, for applications where cabin noise levels are of concern, for decreasing the speed of the fan 20.

Figure 2:
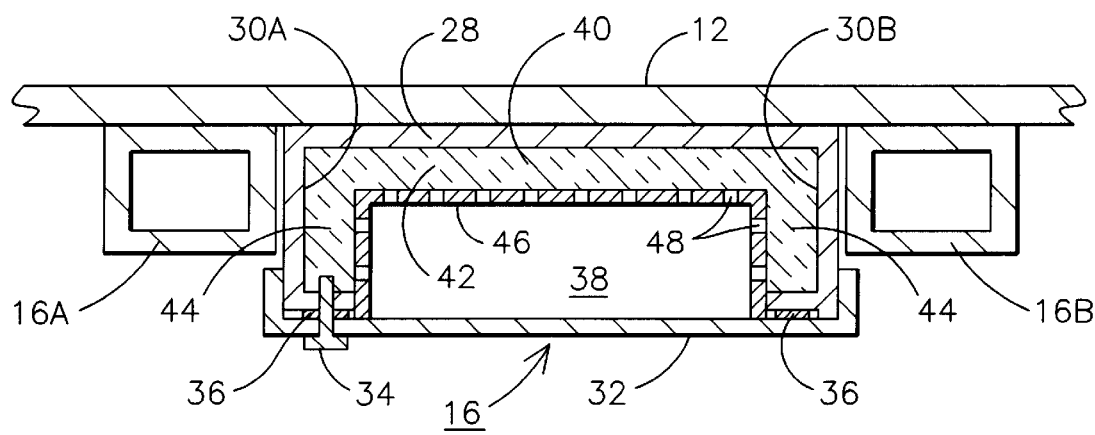
FIG. 2 is a partial cross-sectional view of the locomotive cabin of FIG. 1 illustrating the horizontal duct and adjoining joists providing support for the floor of the cabin.

FIG. 2 is a partial cross-sectional view of the horizontal duct 16 and adjoining joists 16A,16B supporting floor 12. Horizontal duct 16 has a top portion in contact with and operative to support floor 12. Horizontal duct 16 also has opposed side portions 30A,30B, preferably formed to be integral with top portion 28 and in support thereof. In one embodiment, top and side portions 28,30A,30B are formed of 0.125 inch thick sheet metal. Side portions 30A,30B are attached to respective joists 16A,16B, such as by welding, for additional support of top portion 28 and floor 12.

A bottom portion 32 of duct 16 is sealingly and removeably attached to the opposed side portions 30A,30B. In one embodiment, fasteners 34 are used to compress a gasket 36 between the two portions to form an airtight seal defining ventilation cross-sectional area 38. To reduce the sound energy conveyed through area 38, insulating material 40 may be disposed within the duct 16 with a top portion 42 disposed proximate the horizontal duct top portion 28 and opposed side portions 44 disposed proximate the horizontal duct opposed side portions 30A,30B. The insulation 40 may be fiberglass or other material known in the art. A perforated plate 46 may be disposed against the inside surface of the insulation 40 for allowing sound energy to pass through holes 48 to be dissipated within the insulation 40, while providing a relatively smooth air flow surface along cross-sectional area 38.

Figure 3:
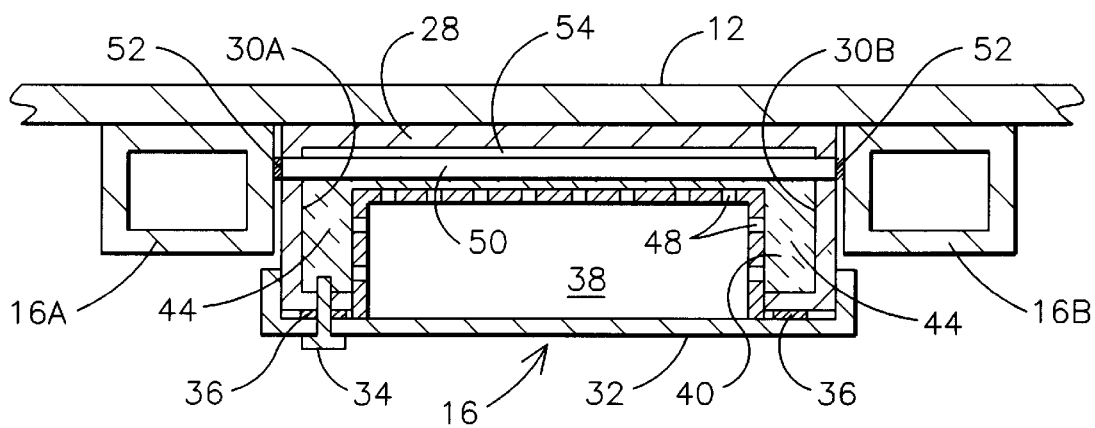
FIG. 3 is a second cross-sectional view of the locomotive cabin of FIG. 1 illustrating the stringers used to provide additional support for the floor of the cabin.

FIG. 3 is a partial cross-sectional view of the horizontal duct 16 and adjoining joists 16A,16B at a different section than that of FIG. 2. This view illustrates a stringer 50 attached at opposed ends to the respective opposed joists 16A,16B, such as by weld joints 52. Stringer 50 supports floor 12 by supporting the top portion 28 of horizontal duct 16. Stringer 50 is at least partially disposed within a cavity 54 formed in the insulation 40. A plurality of stringers 50 may be used along a length of horizontal duct 16 as needed to provide additional support for floor 12. The presence of stringer 50 does not reduce the cross-sectional flow area 38 of the ventilation apparatus because the stringer 50 is recessed into cavity 54. Stringer 54 may be formed of a metal, plastic or reinforced composite material, for example, and it may have a channel, I-beam, or T-beam cross-sectional shape, for example. The use of one or more stringers 50 permits the top portion 28 and side portions 30A,30B of duct 16 to be fabricated of a lighter material while still maintaining the required support for floor 12. The location where stringer 50 passes through the side portion 30A,30B should be maintained as airtight, such as by welding of the side portions 30A,30B to the stringer 50.

Figure 4:
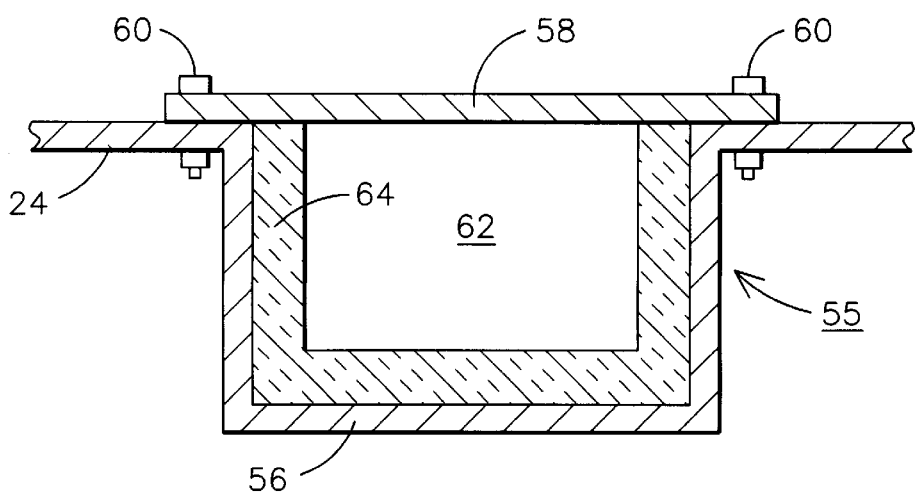
FIG. 4 is a partial top cross-sectional view of the locomotive cabin of FIG. 1 illustrating a vertical duct forming a portion of the wall of a control compartment of the locomotive.

Referring again to FIG. 1, in one embodiment of this invention the ventilating air is conveyed from fan assembly 20 to the cabin 10 by a vertical duct passing through control compartment 24 in fluid communication with outlet 26. FIG. 4 is a partial cross-sectional view of a portion of control compartment 24 showing the vertical duct 55. Vertical duct 55 is formed in part by a portion of a wall 56 of control compartment 24 of the locomotive. In the embodiment illustrated in FIG. 4, the portion of the wall 56 of the control compartment forms three sides of the generally rectangular cross-section of duct 55. The fourth side of the duct 55 is formed by a cover plate 58 attached to control compartment 24 by fasteners 60 to define a cross-sectional flow area 62. Space within the control compartment 24 of a locomotive is very limited. The use of a portion of the wall 56 of the control compartment 24 as a portion of the wall of duct 55 eliminates the need for a separate structure for these two functions, thereby providing the opportunity for an increased cross-sectional flow area 62 when compared to prior art devices. Insulation 64 is disposed against the portion of the wall 56 of the control compartment 24 to reduce the noise conveyed through the duct 55, but more importantly, in order to prevent the formation of condensation in the interior of the control compartment 24 when the air conveyed by duct 55 is cooled. A similar structure may be used to form a horizontal duct 62 along the top of control compartment 24. As seen in FIG. 1, the common wall between horizontal duct 62 and the control compartment 24 forms only one side of the generally rectangular cross-section of duct 62. It may be appreciated that in other embodiments the common wall may form any subset of the overall perimeter of a duct.

Ducts 16,55,62 are connected together in fluid communication with fan 20 to provide ventilating air to cabin 10 through outlets 22,26. It may be appreciated that this invention includes a method for ventilating a locomotive cabin and a method of reducing the noise in a locomotive cabin that includes the steps of providing the structures illustrated in FIGS. 1–4. By providing an increased cross-sectional flow area 38,62 when compared to prior art devices, the ventilating apparatus 14 of the present invention will generate a reduced level of sound energy in cabin 10. The level of sound energy is further reduced by the use of insulation 40,64, and by the avoidance of obstructions in the air flow path, such as by the use of recessed stringers 50. This invention may be implemented in the design of a new locomotive, or it may be implemented by back-fitting such improvements into an existing locomotive design. By replacing one or more of the regularly spaced floor joists, additional area for ventilating ducts may be provided. By using a ventilating duct to support the floor in the area of a replaced joist, the stability of the floor is maintained. Because the floor of a locomotive is subject to significant low frequency bending stress and displacement, it is desirable to avoid long runs of horizontal duct 16 without providing a bend or other means for accommodating displacements. In one embodiment, horizontal duct 16 is limited to a maximum straight length of approximately seven feet. Furthermore, sharp bends should be avoided in the ductwork to avoid the generation of sound energy as air passes through the bend. By combining the steps and structure described above, the overall level of sound energy produced by the HVAC system operating at maximum fan speed was reduced in one application from approximately 75 dbA to approximately 65 dbA.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. An apparatus for ventilating a locomotive cabin, the cabin having a floor supported in part by a plurality of joists disposed under the floor, the apparatus comprising:
    a fan for supplying HVAC air;
    a horizontal duct comprising a top portion in contact with and supporting the floor of the locomotive cabin between two adjacent joists, and further comprising opposed side portions attached to the top portion and to the respective two adjacent joists, the horizontal duct in fluid communication with the fan for conveying the HVAC air; and
    an outlet in fluid communication with the horizontal duct for distributing the HVAC air into the locomotive cabin.

2. The apparatus of claim 1, wherein the horizontal duct further comprises a bottom portion sealingly and removeably attached to the opposed side portions, and further comprising insulation having a top portion disposed proximate the horizontal duct top portion and opposed side portions disposed proximate the horizontal duct opposed side portions.

3. The apparatus of claim 2, further comprising a perforated plate disposed against an inside surface of the insulation.

4. The apparatus of claim 1, further comprising:
    a stringer attached at opposed ends to the respective opposed joists and in contact with the horizontal duct top portion opposed the floor.

5. The apparatus of claim 1, further comprising:
    a vertical duct in fluid communication between the horizontal duct and the outlet, the vertical duct comprising a portion of a wall of a control compartment of the locomotive.

6. The apparatus of claim 5, wherein the vertical duct has a generally rectangular cross-section, and wherein the portion of a wall forms three sides of the rectangular cross-section.

7. The apparatus of claim 5, further comprising insulation disposed against the portion of a wall.

8. An apparatus for ventilating a locomotive cabin, the apparatus comprising:
    a fan for supplying air;
    a horizontal duct comprising a top portion operative to support a floor of the locomotive cabin and opposed side portions attached to the top portion and to respective opposed joists disposed under the floor, the horizontal duct in fluid communication with the fan for conveying the air; and
    an outlet in fluid communication with the horizontal duct for distributing the air into the locomotive cabin, further comprising:
    insulation disposed adjacent the horizontal duct top portion opposed the floor;
    a cavity formed in the insulation; and
    a stringer attached at opposed ends to the respective opposed joists and supporting the cabin floor, the stringer at least partially disposed within the cavity.

9. An apparatus for ventilating a locomotive cabin, the apparatus comprising:
    a fan for supplying air;
    a horizontal duct comprising a too portion operative to support a floor of the locomotive cabin and opposed side portions attached to the top portion and to respective opposed joists disposed under the floor, the horizontal duct in fluid communication with the fan for conveying the air; and
    an outlet in fluid communication with the horizontal duct for distributing the air into the locomotive cabin;
    a stringer attached at opposed ends to the respective opposed joists and in contact with the horizontal duct top portion opposed the floor, further comprising:
    insulation disposed against the horizontal duct top portion opposed the floor;
    a cavity formed in the insulation;
    and wherein the stringer is at least partially disposed within the cavity.

10. An apparatus for ventilating a locomotive cabin, the apparatus comprising:
    a fan for supplying air;
    an outlet for distributing the air into a locomotive cabin; and
    a duct in fluid communication between the fan and the outlet, the duct further comprising a portion of a wall of a control compartment of the locomotive.

11. The apparatus of claim 10, further comprising insulation disposed against the portion of a wall.

12. The apparatus of claim 10, wherein the duct has a rectangular cross-section, and wherein the portion of a wall forms three sides of the rectangular cross-section.

13. The apparatus of claim 10, wherein the duct has a rectangular cross-section, and wherein the portion of a wall forms three sides of the rectangular cross-section along a vertical portion of the duct and the portion of a wall forms one side of the rectangular cross-section along a horizontal portion of the duct.

14. A method for ventilating a locomotive cabin between adjoining opposed joists, the method comprising the steps of:
    providing a fan;
    replacing a joist in a floor of a locomotive cabin with a floor duct, the floor duct positioned to support the floor between adjoining opposed joists; and
    connecting the fan in fluid communication with the floor duct to provide air into a locomotive cabin.

15. The method of claim 14, further comprising the steps of:
    forming a vertical duct as a portion of a wall of a control compartment of the locomotive; and
    connecting the vertical duct in fluid communication with the floor duct.

16. The method of claim 14, further comprising the step of insulating the portion of a wall to prevent condensation from forming in the control compartment.

17. A method for ventilating a locomotive cabin, the method comprising the steps of:
    providing a fan;
    replacing a joist in a floor of a locomotive cabin with a floor duct, the floor duct being operative to support the floor between adjoining opposed joists; and connecting the fan in fluid communication with the floor duct to provide air into a locomotive cabin, further comprising the steps of:

installing insulation in the floor duct opposed the floor;

forming a cavity in the insulation; and installing a stringer between the adjoining opposed joists for supporting the floor, the stringer being at least partially disposed within the cavity.

18. A method of ventilating a locomotive cabin, the method comprising the steps of:

providing a fan;

forming a duct comprising a portion of a wall of a control compartment of a locomotive; and connecting the duct in fluid communication with the fan to provide air to the cabin of the locomotive.

19. The method of claim 18, further comprising the step of insulating the portion of a wall to prevent condensation from forming in the control compartment.

20. The method of claim 18, further comprising the steps of:

installing a horizontal duct in place of a joist in a floor of the locomotive cabin, the horizontal duct operative to provide support for the floor; and connecting the horizontal duct in fluid communication with the fan to provide air to the cabin of the locomotive.

21. Apparatus for ventilating a locomotive cabin having a structural framework of support members for supporting the cabin, with the apparatus utilizing the framework to define at least in part a passageway for delivery of ventilating air to the cabin, the apparatus further comprising:

a fan for supplying HVAC air under pressure;

a duct for directing the HVAC air to the cabin, the duct comprising a first side toward the interior of the cabin, a second side opposite the first side spaced from the interior of the cabin and lateral sides extending along adjacent support members between said first and second sides, the first, second and lateral sides together defining an enclosed fluid flow passageway; and an outlet through an interior member of the cabin and in fluid flow communication with the duct to distribute HVAC air into the locomotive cabin.

22. The apparatus of claim 21 wherein said first side of the duct member is toward the floor of the cabin.

23. The apparatus of claim 22 wherein said support members include floor joists and the lateral sides of the duct extend along adjacent floor joists.

24. The apparatus of claim 21 wherein said first side of the duct member is toward a wall of the cabin.

25. The apparatus of claim 24 wherein said support members include wall support members extending up along a wall of the cabin and the lateral sides of the duct extend along adjacent wall support members.

26. The apparatus of claim 21 further comprising a layer of sound insulation material in the duct along said first side to reduce the noise generated by the flow of HVAC air in the duct.

27. The apparatus of claim 26 further comprising perforate sheet material extending along the sound insulation material spaced from the framework to define at least in part the interior of the duct and support the sound insulation material.

28. The apparatus of claim 26 further comprising a layer of sound insulation material in the duct along said lateral sides to further reduce the noise generated by the flow of HVAC air in the duct.

* * * * *